(12) United States Patent
Avital (10) Patent No.: US 10,885,162 B2
(45) Date of Patent: Jan. 5, 2021

(54) AUTOMATED DETERMINATION OF DEVICE IDENTIFIERS FOR RISK-BASED ACCESS CONTROL IN A COMPUTER NETWORK

(71) Applicant: RSA Security LLC, Bedford, MA (US)

(72) Inventor: Aviv Avital, Ra'anana (IL)

(73) Assignee: RSA Security LLC, Bedford, MA (US)

( * ) Notice: Subject to any disclaimer, the term of this patent is extended or adjusted under 35 U.S.C. 154(b) by 187 days.

(21) Appl. No.: 16/024,594

(22) Filed: Jun. 29, 2018

(65) Prior Publication Data

US 2020/0004936 A1 Jan. 2, 2020

(51) Int. Cl.
  *G06F 21/00* (2013.01)
  *G06F 21/31* (2013.01)
  *G06F 21/57* (2013.01)

(52) U.S. Cl.
  CPC ............ *G06F 21/31* (2013.01); *G06F 21/577* (2013.01); *G06F 2221/034* (2013.01)

(58) Field of Classification Search
  None
  See application file for complete search history.

(56) References Cited

U.S. PATENT DOCUMENTS

| | | | |
|---|---|---|---|
| 6,505,039 B1 | 1/2003 | Boatwright | |
| 8,984,612 B1 | 3/2015 | Gat et al. | |
| 9,800,596 B1 | 10/2017 | Chiles | |
| 9,836,598 B2 * | 12/2017 | Iyer | G06Q 10/105 |
| 10,003,607 B1 | 6/2018 | Kolman et al. | |
| 10,567,402 B1 * | 2/2020 | Comeaux | H04L 63/14 |
| 2008/0162338 A1 | 7/2008 | Samuels et al. | |
| 2014/0189829 A1 * | 7/2014 | McLachlan | H04L 63/08 726/6 |
| 2014/0230051 A1 | 8/2014 | Vallinayagam et al. | |
| 2015/0067472 A1 | 3/2015 | Chen | |
| 2015/0127825 A1 | 5/2015 | Johannsen | |
| 2015/0150110 A1 * | 5/2015 | Canning | H04L 63/12 726/9 |
| 2015/0161394 A1 | 6/2015 | Ferragut et al. | |

(Continued)

FOREIGN PATENT DOCUMENTS

| | | |
|---|---|---|
| CN | 101349987 A | 1/2009 |
| GB | 2491101 A | 11/2012 |

(Continued)

OTHER PUBLICATIONS

Dorothy E. Denning, "An Intrusion-Detection Model," IEEE Transactions on Software Engineering, Feb. 1987, pp. 222-232, vol. SE-13, No. 2.

(Continued)

*Primary Examiner* — Maung T Lwin
(74) *Attorney, Agent, or Firm* — Danielson Legal LLC (57) ABSTRACT

A processing device in an illustrative embodiment includes a processor coupled to a memory and is configured to receive user credentials from a user device in conjunction with an access request, to apply one or more automated tests in order to determine one or more device identifiers of the user device, to generate a risk score for the access request based at least in part on the received user credentials and the one or more determined device identifiers, and to grant or deny the access request based at least in part on the risk score.

20 Claims, 6 Drawing Sheets

(56) References Cited

U.S. PATENT DOCUMENTS

| | | | |
|---|---|---|---|
| 2015/0178715 A1* | 6/2015 | Buhrmann | G06Q 20/322 705/44 |
| 2016/0034900 A1* | 2/2016 | Nelsen | G06Q 20/3224 705/44 |
| 2016/0203491 A1* | 7/2016 | Ranganathan | G06Q 20/4016 705/44 |
| 2017/0039570 A1* | 2/2017 | Krishnappa | G06Q 20/4012 |
| 2018/0288060 A1* | 10/2018 | Jackson | H04L 63/1408 |
| 2019/0138727 A1* | 5/2019 | Dontov | H04L 63/1408 |
| 2019/0260777 A1* | 8/2019 | Mehrotra | H04L 63/1433 |

FOREIGN PATENT DOCUMENTS

| | | |
|---|---|---|
| JP | 2002297543 A | 10/2002 |
| JP | 2005301928 A | 10/2005 |
| WO | 2015043491 A1 | 4/2015 |

OTHER PUBLICATIONS

RSA Security Analytics, "Detect & Investigate Threats." Data Sheet, Oct. 2013, 6 pages.

Y. Wang, "A Multinomial Logistic Regression Modeling Approach for Anomaly Intrusion Detection," Computers and Security, Nov. 2005, pp. 662-674, vol. 24, No. 8.

D. Canali et al., "On the Effectiveness of Risk Prediction Based on Users Browsing Behavior," Proceedings of the 9th ACM Symposium on Information, Computer and Communications Security, Jun. 2014, pp. 171-182.

Y. Carlinet et al., "Analysis of Computer Infection Risk Factors Based on Customer Network Usage," Proceedings of the Second International Conference on Emerging Security Information, Systems and Technologies (SECURWARE), Aug. 2008, pp. 317-325, Cap Esterel, France.

U.S. Appl. No. 15/079,228 filed in the name of Eyal Kolman et al. on Mar. 24, 2016 and entitled "Risk Score Aggregation for Automated Detection of Access Anomalies in a Computer Network."

U.S. Appl. No. 15/174,175 filed in the name of Eyal Kolman et al. on Jun. 6, 2016 and entitled "Automated Setting of Risk Score Aggregation Weights for Detection of Access Anomalies in a Computer Network."

* cited by examiner

AUTOMATED DETERMINATION OF DEVICE IDENTIFIERS FOR RISK-BASED ACCESS CONTROL IN A COMPUTER NETWORK

FIELD

The field relates generally to computer networks, and more particularly to techniques for providing security in a computer network.

BACKGROUND

Computer networks are often configured to incorporate network security systems in order to protect the networks against malicious activity. Such malicious activity can include, for example, fraudulent access requests made by human users or possibly by networks of compromised computers or "botnets."

Network security systems can be designed to protect a computer network of a company, organization or other large enterprise comprising many thousands of user devices. However, enterprise computer networks are in many cases continuously growing in size, and often incorporate a diverse array of user devices, including mobile telephones, laptop computers and tablet computers. This continuous growth can make it increasingly difficult to provide a desired level of protection using the limited resources of the network security system. For example, available network security system functionality such as processing of security alerts and deployment of attack remediation measures on user devices can be strained by the demands of large enterprise networks.

Moreover, recent years have seen the rise of increasingly sophisticated attacks including advanced persistent threats (APTs) which can pose severe risks to enterprises. These APTs are typically orchestrated by well-funded attackers using advanced tools to adapt to the victim environment while maintaining low profiles of activity. As a result, conventional credential-based authentication techniques and other traditional defenses typically deployed by enterprise network security systems today often fail at detecting and remediating access anomalies at a sufficiently early stage.

SUMMARY

Illustrative embodiments provide techniques for automated determination of device identifiers for risk-based access control in a computer network. For example, some embodiments are configured to supplement conventional credential-based authentication techniques and advantageously provide enhanced security against APTs and other types of attacks in enterprise computer networks.

In one embodiment, a processing device comprises a processor coupled to a memory and is configured to receive user credentials from a user device in conjunction with an access request, to apply one or more automated tests in order to determine one or more device identifiers of the user device, to generate a risk score for the access request based at least in part on the received user credentials and the one or more determined device identifiers, and to grant or deny the access request based at least in part on the risk score.

The user credentials may comprise one or more initial device identifiers supplied by the user device, and the one or more determined device identifiers may comprise respective additional device identifiers relative to the one or more initial device identifiers.

In example implementations of such arrangements, generating a risk score based at least in part on the received user credentials and the one or more determined device identifiers may comprise cross-referencing the one or more initial device identifiers with the one or more determined device identifiers to determine whether or not the user device has submitted at least one potentially fraudulent initial device identifier, and utilizing a result of the cross-referencing in generating the risk score.

Some embodiments are configured to generate an initial risk score for the access request utilizing a user access profile and the one or more determined device identifiers, with the granting or denying of the access request being based at least in part on the initial risk score.

Other embodiments are configured to generate an initial risk score for the access request without utilizing the one or more determined device identifiers, and responsive to the initial risk score being above a specified threshold, to utilize the one or more determined device identifiers to generate a modified risk score, with the granting or denying of the access request being based at least in part on the modified risk score.

In example implementations of such arrangements, in accordance with particular selected configuration settings, if the modified risk score is substantially greater than the initial risk score, the access request is denied. On the other hand, if the modified risk score is substantially lower than the initial risk score, the access request is granted. The latter is an example of utilizing the one or more determined device identifiers to detect and correct a false positive indicated by the initial risk score. Other types of configuration settings and associated grant or denial conditions can be used.

Still further embodiments are configured to generate an initial risk score for the access request utilizing the one or more determined device identifiers, to determine that one or more additional device identifiers of the user device are missing from a desired set of device identifiers, to apply one or more additional automated tests in order to determine the one or more additional device identifiers, and to generate a modified risk score utilizing the one or more additional device identifiers, with the granting or denying of the access request being based at least in part on the modified risk score. The one or more additional automated tests can comprise repetitions of previously-applied automated tests for the access request, or new automated tests not previously applied for the access request.

In some embodiments, the one or more automated tests are configured to determine at least one of an operating system identifier of the user device, a particular type of JavaScript engine utilized in a browser of the user device, whether or not the user device is a mobile device, and whether or not the user device supports at least one particular application programming interface for at least one of a particular type of sensor, a particular type of communication hardware and a particular type of input device. Numerous other types of automated tests may be used to determine device identifiers of the user device for utilization in risk-based access control in other embodiments.

A given processing device configured with functionality for automated determination of device identifiers for risk-based access control may be implemented, for example, in one or more network devices of a computer network, or in a security analytics system or other type of network security system associated with the computer network.

These and other illustrative embodiments include, without limitation, methods, apparatus, networks, systems and computer program products each comprising one or more processor-readable storage media.

DETAILED DESCRIPTION

Illustrative embodiments of the present disclosure will be described herein with reference to exemplary computer networks and associated computers, servers, network devices or other types of processing devices. It is to be appreciated, however, that the disclosure is not restricted to the particular illustrative network and device configurations and functionality shown and described in conjunction with the drawings. For example, the term "computer network" as used herein is intended to be broadly construed, so as to encompass, for example, any system comprising multiple networked processing devices.

Figure 1:
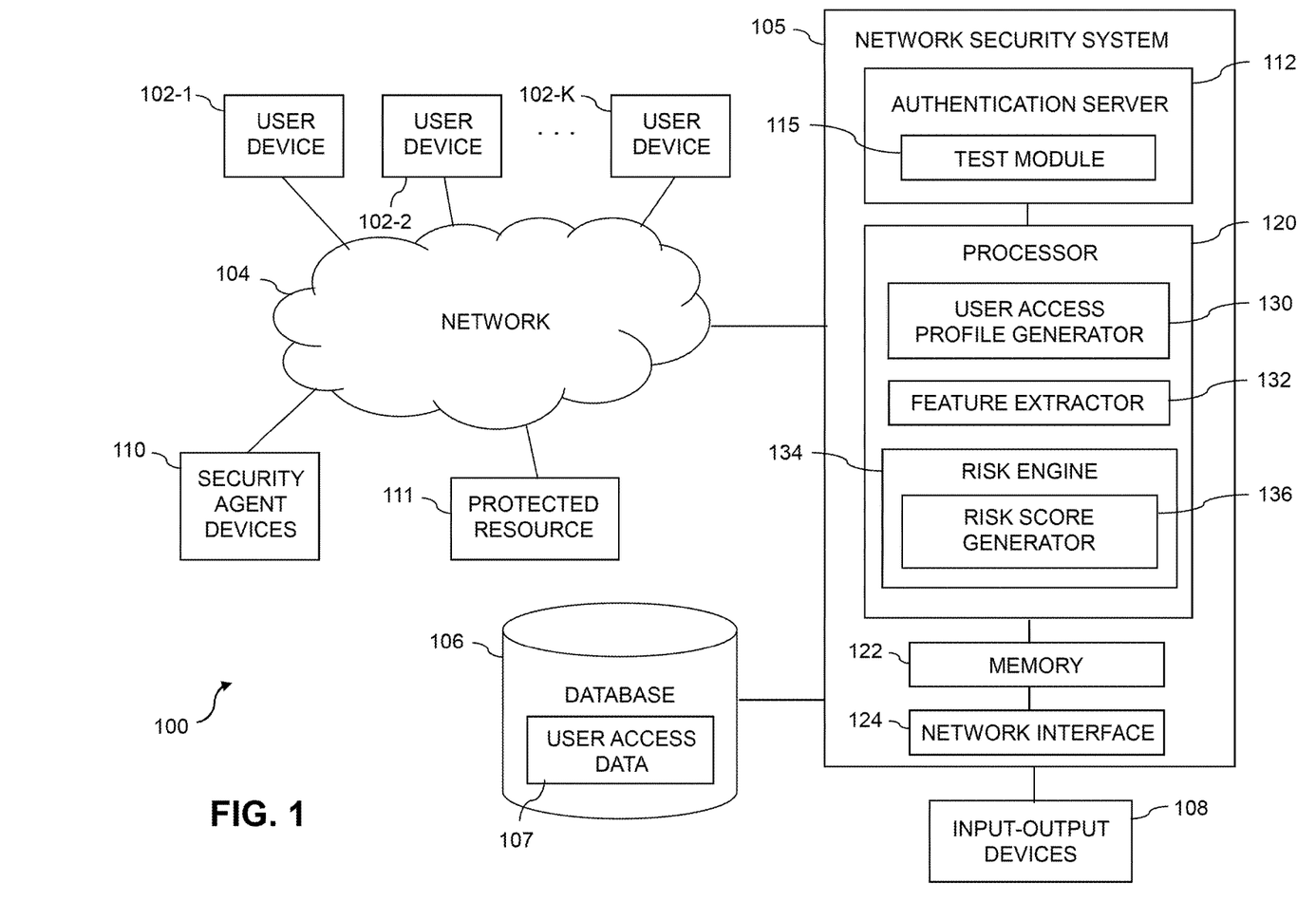
FIG. 1 is a block diagram of a computer network configured with functionality for automated determination of device identifiers for risk-based access control in an illustrative embodiment.

FIG. 1 shows a computer network 100 configured in accordance with an illustrative embodiment. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a network security system 105.

The user devices 102 may comprise, for example, mobile telephones, laptop computers, tablet computers, desktop computers or other types of devices, in any combination, that are capable of supporting user logins or other types of requests to access protected resources of the computer network 100. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using Internet protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The network security system 105 has an associated database 106 configured to store user access data 107 for each of a plurality of distinct user identifiers. Such user access data can illustratively comprise network sessions data, login data or other types of data characterizing user access to protected resources within the computer network 100, as well as various combinations of multiple distinct types of such data. Network sessions data can include, for example, virtual private network (VPN) session data for VPN connections initiated within the computer network 100. Login data can include, for example, authentication data or other types of login data including timestamps and other information associated with login events. Numerous other types of user access data can be used in a given embodiment.

The database 106 in the present embodiment is implemented using one or more storage systems associated with the network security system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

The storage system utilized to implement database 106 and possibly other parts of the computer network 100 can comprise at least one VNX® or Symmetrix VMAX® storage array from Dell EMC of Hopkinton, Mass. Other types of storage arrays that may be used in illustrative embodiments include scale-out all-flash content addressable storage arrays such as XtremIO™ storage arrays, all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

As indicated previously, the user access data 107 in some embodiments illustratively comprises respective timestamps and other authentication information characterizing successful logins processed in conjunction with users attempting to access protected resources of the computer network 100 via the user devices 102. Other types of login events, network session events or other access events can be processed in computer network 100 in order to generate user access data 107.

Also associated with the network security system 105 are input-output devices 108, which illustratively comprise keyboards, displays or other types of input-output devices in any combination. Such input-output devices are used to support one or more user interfaces to the network security system 105, as well as to support communication between the network security system 105 and other related systems and devices not explicitly shown.

In the present embodiment, alerts generated by the network security system 105 are provided over the network 104 to one or more security agent devices 110. Such devices, like the user devices 102, can illustratively comprise mobile telephones, laptop computers, tablet computers, desktop computers, or other types of computers or processing devices configured for communication over network 104 with the network security system 105. For example, a given security agent device can comprise a mobile telephone equipped with a mobile application configured to receive alerts from the network security system 105 and to provide an interface for a security agent to select particular remedial measures for responding to the alert. Examples of such remedial measures may include logging off the user device in question, or requiring various additional authentication factors for subsequent access requests made from the user device in question.

It should be noted that a "security agent" as the term is generally used herein may comprise, for example, an automated entity, such as a hardware, software or firmware entity running on a processing device. Accordingly, like the above-noted "user," a security agent may but need not comprise a human entity.

Access requests initiated by the user devices 102 in the computer network 100 are illustratively directed to protected resources, such as protected resource 111. Any resource subject to risk-based access control may be considered a "protected resource" as that term is broadly used herein.

The network security system 105 comprises an authentication server 112. Login events or other types of access requests initiated at respective ones of the user devices 102 are directed to the authentication server 112 over the network 104 for processing. The authentication server 112 determines if a given access request is authentic based at least in part on presentation of one or more predetermined authentication factors such as user identifiers, passwords or other factors. Such authentication factors are examples of what are more generally referred to herein as "user credentials."

The user credentials in some embodiments can comprise one or more device identifiers that are submitted by a corresponding one of the user devices 102. The term "user credentials" as used herein is therefore intended to be broadly construed.

The authentication server 112 further comprises a test module 115 that is used to control the performance of one or more automated tests relating to a given access request in order to determine one or more device identifiers of the user device submitting the access request. Such determined device identifiers may be in addition to or in place of any initial device identifiers that are part of the user credentials.

The authentication server 112 determines whether to grant or deny a given access request based at least in part on the user credentials and at least one risk score generated for the given access request, illustratively utilizing one or more device identifiers that are determined using automated tests performed by the test module 115, in a manner to be described in more detail below.

Although shown as an element of the network security system 105 in this embodiment, the authentication server 112 in other embodiments can be implemented at least in part externally to the network security system 105, for example, as a stand-alone server, set of servers or other type of authentication system coupled to the network 104.

In the FIG. 1 embodiment, a successful access request may represent a login event for the corresponding user identifier and is logged in the database 106 as part of the user access data 107. Other types of authentication mechanisms and associated login events or other user access data can be used in other embodiments.

The network security system 105 in the FIG. 1 embodiment is assumed to be implemented using at least one processing device. Each such processing device generally comprises at least one processor and an associated memory, and implements one or more functional modules for controlling certain features of the network security system 105.

More particularly, the network security system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 122 illustratively comprises random access memory (RAM), read-only memory (ROM), flash memory or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered illustrative embodiments of the present disclosure. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the network security system 105 to communicate over the network 104 with the user devices 102, the security agent devices 110, and the protected resource 111, and illustratively comprises one or more conventional transceivers.

The processor 120 further comprises a user access profile generator 130, a feature extractor 132, a risk engine 134 and a risk score generator 136. The risk engine 134 may further include a feature weighting module, not explicitly shown in the figure, configured to determine weights for application to respective feature risk scores generated using features extracted by the feature extractor 132 in generating a composite risk score in the risk engine 134. The risk engine 134 may similarly include one or more other additional or alternative components associated with risk score generation.

The user access profile generator 130 is configured to generate access profiles for respective user identifiers. Such an access profile for a given user identifier may be based on user access data from multiple user accesses attributed to that same user identifier. Each of the user identifiers illustratively identifies a particular user associated with at least a corresponding one of the user devices 102. In addition, at least a subset of the user accesses utilized to generate the access profiles in the user access profile generator are illustratively initiated from the user devices 102 over the network 104. As noted above, the user access data 107 illustratively includes information relating to login events associated with respective logins initiated from user devices 102 over the network 104, although additional or alternative types of user access data could be processed in other embodiments. The processed user access data illustratively comprises at least portions of the user access data 107 stored in the database 106, although user access data can be captured and stored for subsequent processing in the network security system 105 of the computer network 100 in other ways.

Examples of access profiles that may be utilized in a given embodiment include login profiles, network session profiles or other types of profiles characterizing user access to protected resources in the computer network 100.

A given access profile illustratively comprises a plurality of histograms for respective ones of a plurality of features extracted at least in part from user access data characterizing multiple user accesses for a given one of the user identifiers. Such feature extraction is assumed to be performed by the feature extractor 132 operating in conjunction with the user access profile generator 130.

In some embodiments, the network security system 105 gathers sufficient information from a user device during an initial enrollment or authentication of a corresponding user in order to create a user access profile for later use, utilizing the authentication server 112 and the user access profile generator 130. A given such user access profile is illustratively utilized by the risk engine 134 in conjunction with a subsequent transaction or other access request to generate a risk score for that access request.

The feature extractor 132 is further configured to obtain data characterizing a current access for the given user identifier and to extract features from the data characterizing the current access for the given user identifier.

The risk engine 134 generates feature risk scores for the current access based on the features extracted from the data characterizing the current access for the given user identifier and the access profile for the given user identifier. The risk engine 134 is further configured to aggregate the feature risk scores to form a composite risk score. This aggregating is illustratively performed by weighting the feature risk scores utilizing feature risk score weights.

In some embodiments, the weights can be automatically set using techniques of the type disclosed in U.S. patent application Ser. No. 15/174,175, filed Jun. 6, 2016 and entitled "Automated Setting of Risk Score Aggregation Weights for Detection of Access Anomalies in a Computer Network," which is incorporated by reference herein.

Additionally or alternatively, the network security system 105 may incorporate risk score generation functionality of the type described in U.S. Pat. No. 10,003,607, entitled "Automated Detection of Session-Based Access Anomalies in a Computer Network through Processing of Session Data," and U.S. Pat. No. 9,800,596, entitled "Automated Detection of Time-Based Access Anomalies in a Computer Network through Processing of Login Data," both of which are incorporated by reference herein.

In some embodiments, the risk engine 134 comprises an RSA Common Risk Engine (CRE). The CRE is a machine learning based risk engine that is configured to detect fraudulent behavior, utilizing periodic (e.g., daily) learning processes. It processes received data elements (e.g., device location, IP address, cookie, etc.) to calculate features that are used to generate a composite risk score for a particular transaction. For example, the CRE can learn the typical locations for a given user device, and can indicate an elevated risk score if a given access request is coming from a previously-unseen location for that user device, as new locations are often indicative of fraud.

In one possible operating scenario of the computer network 100, the authentication server 112 receives user credentials from one of the user devices 102 in conjunction with an access request, applies one or more automated tests via test module 115 in order to determine one or more device identifiers of the user device. The risk engine 134 utilizes its risk score generator 136 to generate a risk score for the access request based at least in part on the received user credentials and the one or more determined device identifiers. The resulting risk score is illustratively returned by the risk engine 134 to the authentication server 112 and utilized in granting or denying the access request.

In some embodiments, the user credentials comprise one or more initial device identifiers supplied by the user device, and the one or more determined device identifiers obtained through automated testing by the test module 115 comprise respective additional device identifiers relative to the one or more initial device identifiers.

In an example arrangement of this type, generating a risk score based at least in part on the received user credentials and the one or more determined device identifiers illustratively comprises cross-referencing the one or more initial device identifiers with the one or more determined device identifiers to determine whether or not the user device has submitted at least one potentially fraudulent initial device identifier, and utilizing a result of the cross-referencing in generating the risk score.

Such an arrangement can advantageously detect situations in which a user device may be attempting to withhold or misrepresent certain ones of its device characteristics in order to disguise its true intent.

As a more particular example, the risk engine 134 may be configured to perform an initial risk calculation to deduce the nature of a particular transaction based on collection of one or more initial device identifiers predetermined for that type of transaction. In such cases, the user device would send the initial device identifiers, and during risk assessment the automated test results will be provided as well. In conjunction with risk score calculation, the risk engine 134 is configured to cross-reference the automated test results with the collected initial device identifiers to find any discrepancies. If such discrepancies are detected, it is likely the user was not "honest" about the device identifiers collected during the initial risk calculation. The risk score can then be adjusted accordingly, possibly leading to rejection of the transaction. Numerous other access request scenarios can be handled in a similar manner.

In some embodiments, generating a risk score based at least in part on the received user credentials and the one or more determined device identifiers comprises generating an initial risk score for the access request utilizing a user access profile and the one or more determined device identifiers, and granting or denying the access request is based at least in part on the initial risk score. For example, the test module 115 of the authentication server 112 can perform the one or more automated tests and provide the corresponding test results to the risk engine 134 for use in generating the initial risk score. The risk engine 134 in such an embodiment illustratively utilizes a user access profile supplied by the user access profile generator 130 as well as additional features extracted from the current access request using the feature extractor 132 in determining the initial risk score.

In other embodiments, generating a risk score based at least in part on the received user credentials and the one or more determined device identifiers comprises generating an initial risk score for the access request without utilizing the one or more determined device identifiers, and responsive to the initial risk score being above a specified threshold, utilizing the one or more determined device identifiers to generate a modified risk score. The access request is then granted or denied based at least in part on the modified risk score.

For example, responsive to the modified risk score being substantially greater than the initial risk score, the access request may be denied, and responsive to the modified risk being substantially lower than the initial risk score, the access request may be granted. The latter is an example of utilizing the one or more determined device identifiers to detect and correct a false positive indicated by the initial risk score.

Such an arrangement assumes that the authentication server 112 is configured in accordance with particular selected configuration settings supporting the above-noted grant and denial conditions. For example, the authentication server 112 can be configured in accordance with a "failed-closed" or a "failed-open" policy, which dictates how the authentication server 112 will act in case of a failure to align an initial risk score with a modified risk score that takes the automated test results into account. Other types of configuration settings and associated grant or denial conditions can be used.

In some embodiments, generating a risk score based at least in part on the received user credentials and the one or more determined device identifiers comprises generating an initial risk score for the access request utilizing the one or more determined device identifiers, determining that one or more additional device identifiers of the user device are missing from a desired set of device identifiers, applying one or more additional automated tests in order to determine the one or more additional device identifiers, and generating a modified risk score utilizing the one or more additional device identifiers. The access request is then granted or denied based at least in part on the modified risk score. The one or more additional automated tests can comprise repetitions of previously-applied automated tests for the access request, or new automated tests not previously applied for the access request. For example, one or more missing device identifiers can be obtained through repeating corresponding ones of the automated tests, or through application of other automated tests that utilize potentially different approaches to collect the missing device identifiers.

In at least some of the foregoing embodiments, automated tests are performed by or under the control of the test module 115 of the authentication server 112, and the risk scores are generated by the risk score generator 136 of the risk engine 134, utilizing one or more device identifiers, possibly in conjunction with user access profiles provided by user access profile generator 130 and features extracted for a current access request by the feature extractor 132. Test results collected by the test module 115 are supplied to the risk engine 134. Risk scores generated by the risk engine 134 utilizing those test results are supplied to the authentication server 112 and utilized in granting or rejecting an access request by a given one of the user devices 102 to a protected resource such as protected resource 111.

Additional details regarding automated determination of device identifiers for risk-based access control will be described below in conjunction with the illustrative embodiments of FIGS. 2 through 6.

In some embodiments, the risk engine 134 is configured to compare the composite risk score to a threshold, and to generate an alert relating to the current access based on a result of the comparison. The alert in such an embodiment is assumed to be transmitted via the network interface 124 over the network 104 to a security agent associated with one of the security agent devices 110. In other embodiments, multiple alerts of different types can be generated relating to the current access.

An arrangement of this type can permit the network security system 105 to focus its efforts on the particular ones of the user devices 102 that are most likely to be subject to attacks. Accordingly, the limited resources of the network security system 105 available for attack detection and remediation can be more intelligently and effectively deployed in the computer network 100, resulting in improved performance as well as enhanced security against APTs and other types of attacks.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the user access profile generator 130, feature extractor 132, risk engine 134 and risk score generator 136 may be implemented at least in part in the form of software that is stored in memory 122 and executed by processor 120. Similarly, at least portions of the authentication server 112 and/or test module 115 of the network security system 105 can be implemented at least in part in the form of software that is stored in memory 122 and executed by processor 120.

In other embodiments, at least portions of the test module 115 can be implemented in another component of network security system 105 or computer network 100. For example, although shown in the embodiment of FIG. 1 as being part of the authentication server 112, the test module 115 in other embodiments can be implemented at least in part in the risk engine 134 of the processor 120.

It is therefore to be understood that the particular set of elements shown in FIG. 1 for automated determination of device identifiers for risk-based access control in computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the network security system 105 can be eliminated and associated elements such as authentication server 112, test module 115, user access profile generator 130, feature extractor 132, risk engine 134 and risk score generator 136 can be implemented elsewhere in the computer network 100.

In some embodiments, the network security system 105 is a part of or otherwise associated with another system, such as, for example, a security operations center (SOC) or a critical incident response center (CIRC).

Additionally or alternatively, the network security system 105 can be part of or incorporate an otherwise conventional security analytics system, such as the RSA Security Analytics system commercially available from RSA, part of Dell EMC.

Other embodiments can implement the network security system 105 and its associated authentication server 112 as part of or in conjunction with a security information and event management (SIEM) system, such as the enVision® platform, also commercially available from RSA. Such an SIEM system is also considered another possible example of a "network security system" as that term is broadly used herein. In an embodiment of this type, at least portions of the user access data 107 stored in the database 106 illustratively comprise security logs collected by the SIEM system.

An exemplary process utilizing authentication server 112, risk engine 134 and one or more other modules of the processor 120 will now be described with reference to the flow diagram of FIG. 2. It is to be understood that this particular process is only an example, and additional or alternative processes can be carried out in other embodiments.

In this embodiment, the process includes steps 200 through 208. These steps are assumed to be performed at least in part by the authentication server 112 operating in conjunction with the risk engine 134 and one or more other modules of the processor 120, although it is to be appreciated that alternative components can perform the described processing operations in other embodiments.

In step 200, user credentials are received from a user device in conjunction with an access request. For example, the user credentials illustratively comprise predetermined authentication factors such as user identifiers, passwords or other factors. Such user credentials are illustratively received by the authentication server 112 from one of the user devices 102 in conjunction with an attempt by the user device 102 to access the protected resource 111, although numerous other access request scenarios are contemplated. The user identifiers in some cases can comprise one or more initial device identifiers.

In step 202, one or more automated tests are applied in order to determine one or more device identifiers of the user device. These device identifiers are illustratively in addition to any initial device identifiers that are provided as part of or otherwise in conjunction with the user credentials.

A wide variety of different automated tests can be used in illustrative embodiments herein. For example, one or more of the automated tests performed by or under the control of the test module 115 of the authentication server 112 can be configured to determine an operating system identifier of the user device, to determine a particular type of JavaScript engine utilized in a browser of the user device, to determine whether or not the user device is a mobile device, or to determine whether or not the user device supports at least one particular application programming interface (API) for at least one of a particular type of sensor, a particular type of communication hardware and a particular type of input device. These and numerous other automated tests will be described in more detail below.

In step 204, a risk score is generated for the access request based at least in part on the received user credentials and the one or more determined device identifiers. The risk score may be an initial risk score or a modified risk score, as previously described in conjunction with the FIG. 1 embodiment.

In step 206, the access request is granted or denied based at least in part on the risk score.

In step 208, a corresponding user access profile is updated. The process then returns to step 200 to process an additional access request from the same one of the user devices 102 or a different one of the user devices 102.

Additional instances of steps 200 through 208 can be performed responsive to occurrence of additional accesses for respective user identifiers or may otherwise be repeated periodically in order to ensure that access anomalies are accurately and efficiently detected within the computer network 100. For example, user access profiles in some embodiments can be continuously or periodically tuned based on additional accesses that occur for those user identifiers within the computer network 100.

Figure 2:
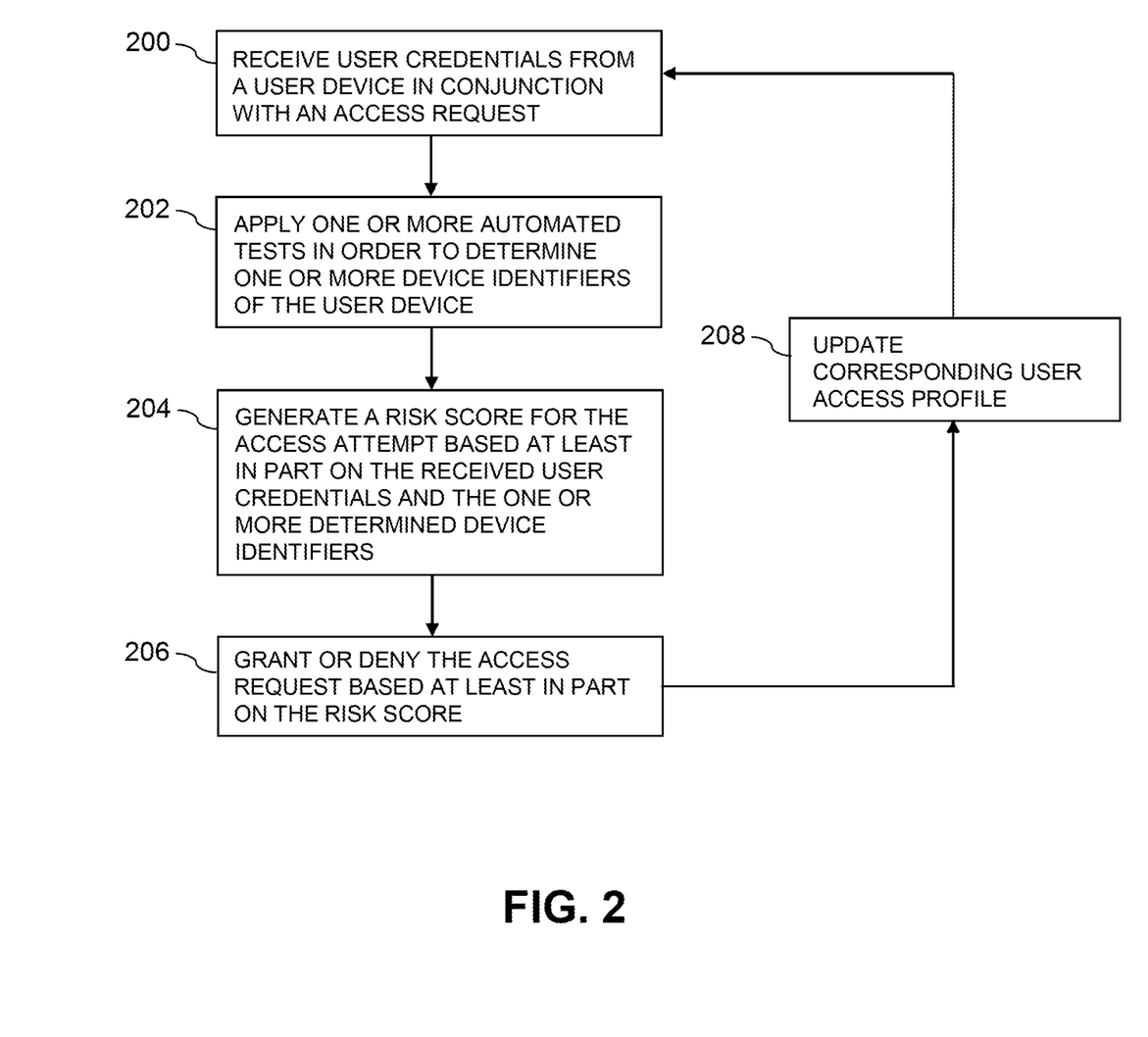
FIG. 2 is a flow diagram of a process for automated determination of device identifiers for risk-based access control in an illustrative embodiment.

Again, the FIG. 2 process is just one illustrative embodiment, and numerous alternative embodiments including those described in conjunction with FIG. 1 are also contemplated.

In some embodiments, a risk score is compared to a threshold and an alert is generated for the current access based on a result of comparing the risk score to the threshold. For example, the alert may be generated if a composite risk score computed by the risk engine 134 exceeds the threshold. The composite risk score is illustratively generated by risk aggregation utilizing weights applied to individual feature risk scores computed for respective ones of a plurality of extracted features.

It is assumed in the present embodiment that the current access is processed in real time by the network security system 105, responsive to initiation of the current access within the computer network 100. In other embodiments, the current access can be processed as part of a batch of additional accesses retrieved from the database 106 at one of a plurality of periodic processing intervals. The network security system 105 can therefore be configured to support a real-time processing mode of operation, a batch processing mode of operation, or combinations of real-time processing, batch processing or other types of processing modes.

As noted above, an alert may be generated relating to the current access request based on a result of comparing the risk score to the threshold. It is also possible for multiple alerts of different types to be generated, possibly based on comparisons of the composite risk score or portions thereof to different thresholds. Accordingly, multiple alerts can be generated relative to respective different thresholds in some embodiments.

In some embodiments, an alert is provided to a security agent and one or more automated remedial actions are taken in the network security system 105 responsive to the alert. For example, the alert may be transmitted over the network 104 to one of the security agent devices 110. The automated remedial actions can illustratively include, for example, requiring submission of one or more additional authentication factors from a given one of the user devices 102 that is determined to be associated with an anomalous access. Such remedial actions can include terminating the current access or suspending the current access until the one or more additional authentication factors are obtained and verified.

Numerous other techniques can be used in association with automated determination of device identifiers and associated risk-based access control. For example, alternative processes can include other types and arrangements of automated tests, risk score generation and other processing operations.

Accordingly, the particular processing operations and other network functionality described in conjunction with the flow diagram of FIG. 2 are presented by way of illustrative example only, and should not be construed as limiting the scope of the disclosure in any way. Alternative embodiments can use other types of processing operations to test for device identifiers and utilize those device identifiers in risk score generation. For example, the ordering of the process steps may be varied in other embodiments, or certain steps may be performed concurrently with one another rather than serially. Also, as indicated previously, the process steps or subsets thereof may be repeated periodically or under other conditions in conjunction with respective distinct instances of risk-based access control.

Examples of particular automated tests that are performed by or under the control of the test module 115 of the authentication server 112 in illustrative embodiments will now be described in more detail.

As noted above, some automated tests are configured to determine an operating system identifier of the user device that issued the access request. User device operating systems that can be distinguished using one or more automated tests in illustrative embodiments include, for example, Microsoft Windows, Linux (e.g., Debian/Ubuntu, RedHat/Fedora/CentOS, Suse, Arch, Gentoo), and Apple OSX.

A given one of the automated tests can be configured to determine the operating system identifier of the user device based at least in part on one or more environment variables of the user device having a particular predetermined format. Environment variables are typically listed at the operating system level, and usually store values for paths, usernames, etc. In addition to user defined environment variables, an operating system may have several default environment variables. Both the existence and value of specific environment variables can be used to distinguish the operating system version.

For example, in Windows, accesses to any environment variable must be surrounded by the percent sign (%), for example, as in %SYSTEMROOT%, while in Linux and OSX, accesses to any environment variable must have an initial dollar sign ($), for example, as in $HOME. Accordingly, a given automated test can be configured to request a list of environment variables using a set command, and then detect access to a particular environment variable using either percent signs or a dollar sign in order to determine the particular operating system utilized by the user device.

Another example of an automated test based on environment variable utilizes the fact that the values of certain environment variables were changed between versions of a given operating system. More particularly, it is possible to determine the version of a Windows operating system at least in part by identifying the presence of particular variables that were changed from one version of the operating system to another. Examples of environment variables that are changed between the Windows XP operating system and the Windows Vista/7/8/10 operating systems include at least the following environment variables: ALLUSERSPROFILE, APPDATA, COMMONPROGRAMFILES, COMMONPROGRAMFILES(x86), COMSPEC, HOMEDRIVE, HOMEPATH, PROGRAMFILES, PROGRAMFILES (X86), SYSTEMDRIVE, SYSTEMROOT, TEMP, TMP, USERPROFILE, and WINDIR.

Other automated tests determine the operating system identifier of the user device based at least in part on the user device utilizing a particular type of file system. For example, most operating systems support unique file systems, some of which are only available in recent operating system versions. As more particular examples, certain Windows versions support FAT32, NTFS, exFAT and UDF, certain OSX versions support HFS (old macOS), APFS (since macOS 10.13) and UFS (not supported since OSX Lion), and certain Linux versions support EXT4 (kernel 2.6.28 and above), Btrfs (kernel 2.6.29 and above). Accordingly, a given automated test can be configured to determine the operating system identifier of the user device by detecting that the user device utilizes a particular type of file system.

Automated test can additionally or alternatively, be configured to determine the operating system identifier of the user device based at least in part on a file structure of the user device having a particular predetermined format. For example, different operating systems place user home directories in different locations. More particularly, in Windows, the user home directory is located under C:\Users\username, while in Linux, the user home directory is located under /home/username, and in OSX, the user home directory is located under/Users/username. Accordingly, a given automated test can be configured to determine the operating system identifier by detecting such home directory placement distinctions.

Some automated tests are configured to determine the operating system identifier of the user device based at least in part on the user device including one or more predetermined binaries. An operating system is typically bundled with many binaries, designed for use by a system administrator. In Windows, regedit.exe is a binary designed to help maintaining the Windows Registry. In OSX, launchctl is a binary that launches the Apple Launchpad, a service management framework. In the Linux RedHat family, systemctl is a binary responsible for maintaining services, such as httpd. A given automated test can therefore be configured to determine the operating system identifier by detecting the presence of one or more binaries associated with a particular operating system.

In some embodiments, a given automated test determines the operating system identifier of the user device based at least in part on the user device including one or more predetermined network device characteristics.

For example, the given automated test can detect utilization of a particular IP identification field generation algorithm. Different operating systems utilize different algorithms to generate the 16-bit ID field in IP packets transmitted by the user device, and such distinctions can be detected to determine the operating system identifier.

As another example, the given automated test can detect utilization of a particular one of a "big-endian" ordering or a "little-endian" ordering in ordering data for network transmission. Before sending data to the network, a network device driver of the user device will typically divide the data into even/uneven chunks (e.g., depending on size, policy, etc.). The order in which the data appears in these chunks is responsibility of the operating system. The order is measured by "endianness," or the way the data is represented, where big-endian (i.e., host byte order) is when the most significant byte is last, and little-endian (i.e., network byte order) is when the least significant byte is last. The value 8 in binary, 1000, will therefore be 1000 in big endian or 0001 in little-endian. In Windows operating systems, the order is big-endian, while in Linux/OSX operating systems, the order is little-endian. The given automated test can detect this ordering distinction and use it in determining the operating system identifier.

As yet another example, the given automated test can detect utilization of a particular sequence number generation algorithm as part of a handshake protocol. In conjunction with establishment of an initial connection between two networked parties, network protocols typically dictate that the two parties must perform a handshake. During that handshake, various information elements are exchanged in order to achieve an optimal negotiation (e.g., for increased performance, security, etc.). For example, each party generates (among other elements) a sequence number, to act as a "key" in order to distinguish this connection from others. The algorithms used for generating those sequence numbers are publicly known, and receipt of an initial sequence number can indicate not just the operating system but also the particular version of the operating system as well. A given automated test detecting sequence number distinctions can utilize a security tool such as Nmap, which includes numerous sequence number types in its database. For example, it includes indications for specific operating system versions such as OSx 10.10, Windows 10 1607, RedHat 7.3, and many others.

Some embodiments utilize one or more automated tests to determine whether or not the user device is a mobile device and/or to determine whether or not the user device supports at least one particular API for at least one of a particular type of sensor (e.g., a fingerprint reader, a gyroscope, an NFC sensor, a front camera, a back camera, etc.), a particular type of communication hardware (e.g., a cellular antenna) and a particular type of input device (e.g., a touchscreen). Most current mobile device operating systems, including Android and iOS, generally rely solely on Linux.

As one illustration, detection of a fingerprint reader as part of a given automated test will typically indicate that the user device is a mobile device. Operating systems such as Android or iOS offer distinct APIs to interact with the fingerprint reader. In addition, as Android has only recently begun conforming towards a narrowed down list of APIs, different vendors in Android have different proprietary implementations of the fingerprint reader. For example, the Samsung API for the fingerprint reader is called Samsung Pass, which allows unique abilities only available on specific Samsung devices. Such proprietary implementations are restricted to specific environments, so by successfully executing a proprietary API call, an automated test can also obtain additional elements such as an Android version. Similarly, the Apple iOS implementation of the fingerprint reader, referred to as Apple TouchID, is significantly different than any Android implementation of a fingerprint reader, and different APIs in the Apple TouchID context can disclose different versions of iOS.

A more detailed example of an automated test configured to determine one or more user device identifiers based on detection of a particular fingerprint reader on the user device is as follows:

1. Activate API to interact with Android fingerprint reader
2. If successful
   a. User is operating from a mobile device
   b. User is running Android
   c. Activate proprietary implementation, such as Samsung Pass
   d. If successful
      i. Android version is within the supported range (e.g., Android 6.0-8.0)
3. Else
   a. Activate API to interact with iOS fingerprint reader (TouchID)
   b. If successful
      i. User is operating from a mobile device
      ii. User is running iOS
      iii. Activate recently published API
      iv. If successful
         1. User is running a recent iOS version
      v. Else
         1. User is running a legacy version of iOS
   c. Else
      i. User is operating from a PC
      ii. Proceed with other tests for operating system Such as test may be performed by or under the control of the test module 115 of the authentication server 112. The particular operations and their sequence in this example automated test, and in other example automated tests disclosed herein, should not be construed as limiting in any way.

Other embodiments can utilize automated tests performed by or under the control of the test module 115 to determine other device identifiers, such as a type of JavaScript engine utilized in a browser of the user device. A JavaScript engine is a type of interpreter, embedded inside the browser, which executes JavaScript code. Each of the major browser vendors has its own implementation of JavaScript embedded in its browser. For example, Google Chrome uses V8 as its JavaScript engine, Firefox uses SpiderMonkey, and so on. Each JavaScript engine implementation is different, and although most of the features are offered across all engines, there are several that are limitations by design. Such limitations can be tested through simple JavaScript API calls. Knowing these limitations, browser vendors such as Google Chrome offer similar functionality using different APIs. Since there is no real incentive to "fix" such limitations, an automated test for this particular device identifier would require a very substantial effort to fabricate test results, as the fraudulent user would have to write an entirely new JavaScript implementation to get by the automated test.

Illustrative embodiments can therefore be advantageously configured to leverage the differences between the JavaScript engines or other interpreters of user device browsers in order to determine corresponding device identifiers for use in risk-based access control. For example, a given automated test in some embodiments can execute selected test suites from publicly-available ECMAScript conformance tests in order to detect differences between the various JavaScript engine implementations. Each test suite covers different functionality in the JavaScript engine implementation. A decision tree can be constructed to determine a device identifier specifying the particular browser of the user device based on the test results.

These and other automated tests disclosed herein are illustratively configured to detect false identifiers generated through various tools such as FraudFox that are utilized by fraudulent users to disguise their actual device identifiers.

In some embodiments, one or more of the above-described automated tests are executed in conjunction with a given access request received from one of the user devices 102, and utilized to determine device identifiers that are utilized by the risk engine 134 to generate a risk score. The risk score is provided to the authentication server 112 for use in determining whether to grant or deny the access request.

Additional description regarding examples of risk-based access control utilizing automated determination of device identifiers in illustrative embodiments will be provided below in conjunction with FIGS. 3 through 6. Each of these figures illustrates example interactions between a particular user device 102-1, the authentication server 112, the risk engine 134 and the protected resource 111. The user device 102-1 in each figure generates a request for authentication to the authentication server 112 in order to access the protected resource 111. The user device 102-1 is then prompted by the authentication server 112 for user credentials. In response, the user credentials are supplied by the user device 102-1 to the authentication server 112 along with data elements that may be viewed as examples of what are also referred to herein as "initial device identifiers." Such initial device identifiers in some cases are assumed to be part of the user credentials.

Figure 3:
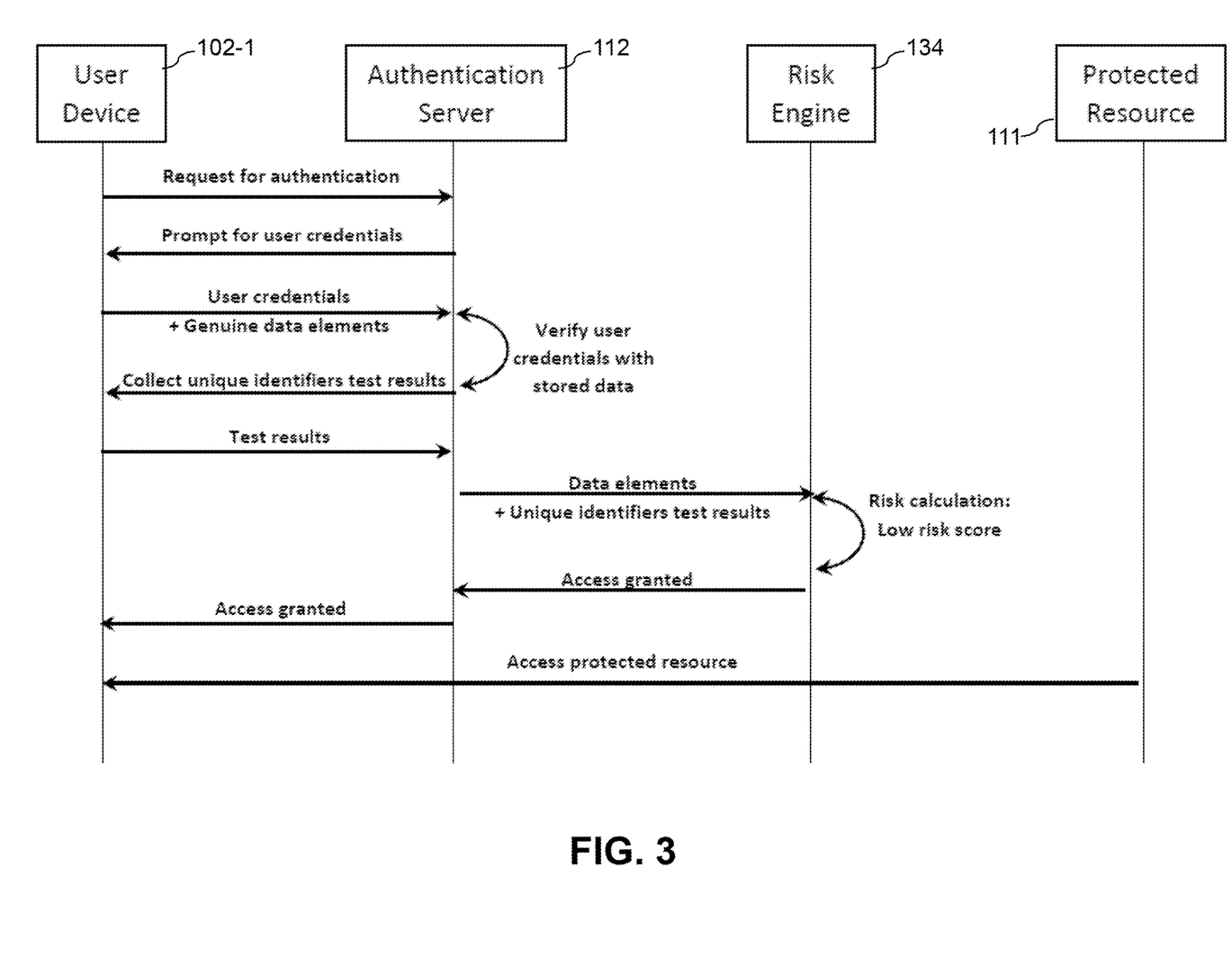
FIGS. 3 through 6 are signaling diagrams showing example arrangements utilizing automated determination of device identifiers for risk-based access control in illustrative embodiments.

Referring initially to FIG. 3, a first use case is illustrated that involves genuine data elements and a low risk score. In this use case, a genuine user is attempting to access the protected resource 111. After providing the user credentials and associated genuine data elements, which are verified against stored data by the authentication server 112, one or more automated tests are performed in order to collect additional device identifiers, also referred to as "unique identifiers" in the context of the present embodiments. The particular automated tests to be performed and the particular unique identifiers to be collected are illustratively specified by a policy setting forth the requirements of a "normal" authentication process. The authentication server 112 performs the automated tests through interaction with the user device 102-1 and thereby obtains the corresponding test results, which are provided with the other data elements to the risk engine 134. The risk engine 134 in this use case generates a low risk score, which is returned to the authentication server 112. The authentication server 112 based on the low risk score grants the user device 102-1 access to the protected resource 111.

Figure 4:
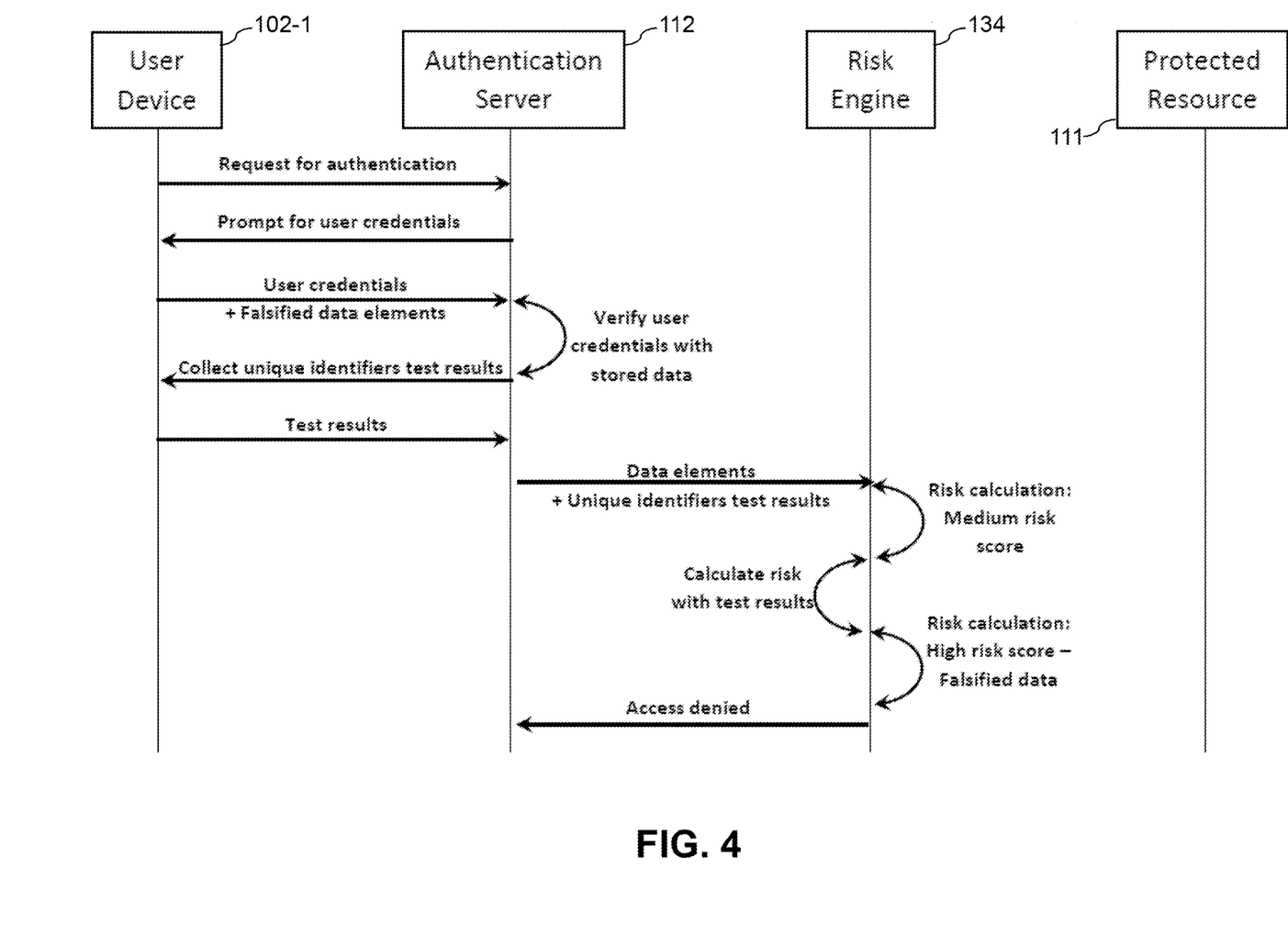

FIG. 4 illustrates a second use case. The second use case is similar to the first use case but involves falsified data elements and a medium initial risk score. In this use case, a fraudulent user is attempting to falsify data elements. An initial risk score generated by the risk engine 134 based on the data elements shows a medium level of risk. The risk engine 134 then utilizes the unique identifiers in the test results to generate a modified risk score which indicates falsified data elements and a high level of risk. The authentication server 112 based on the high risk score denies the user device 102-1 access to the protected resource 111. This use case depicts a scenario where the unique identifiers are used as a fallback instead of being directly incorporated into the initial risk score calculation. Such a scenario may be relevant in those situations where utilization of the unique identifiers may adversely impact performance, and so those unique identifiers are only utilized as a fallback.

Figure 5:
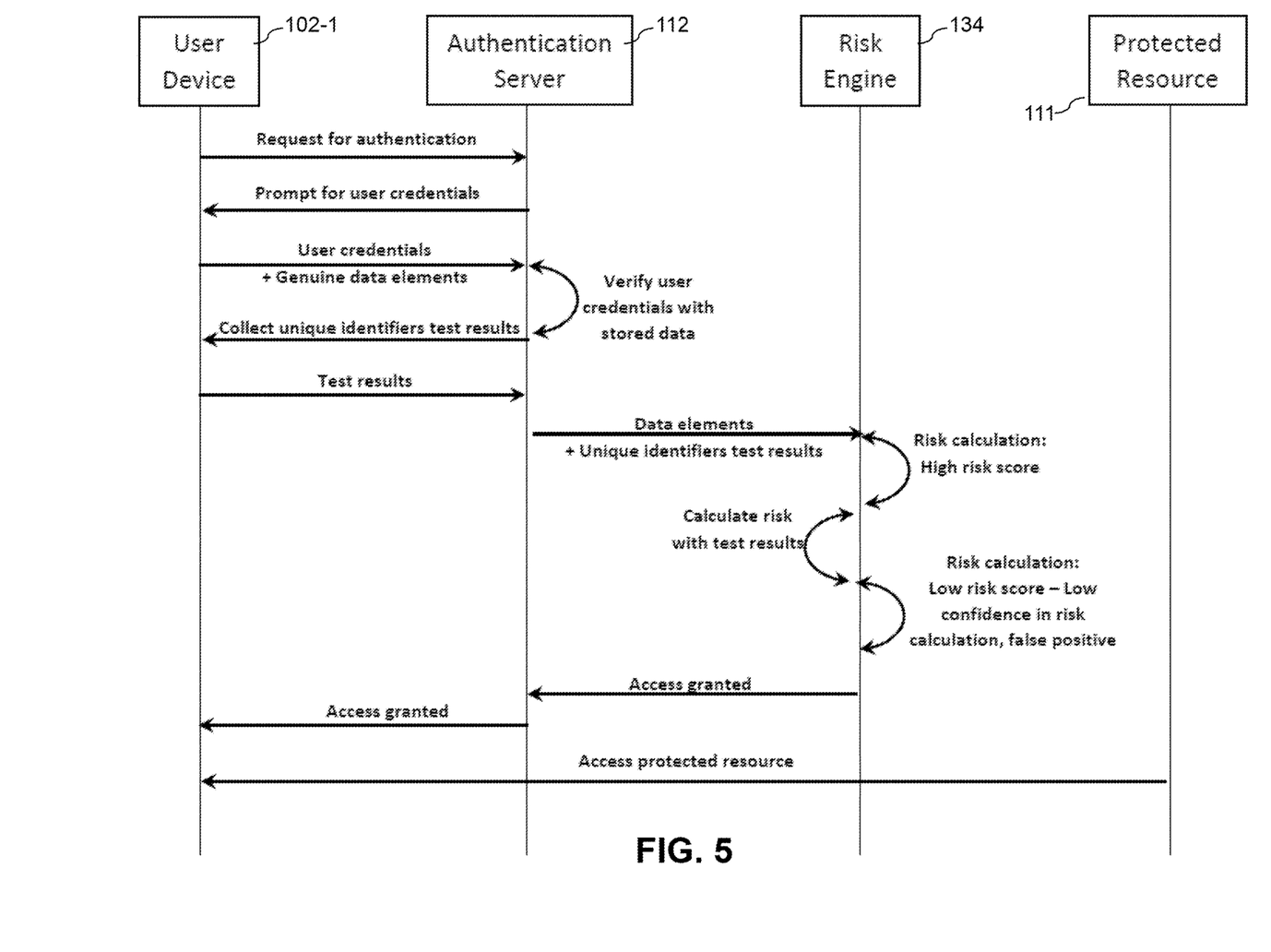

FIG. 5 illustrates a third use case. This third use case involves genuine data elements and a high initial risk score with false positive detection. In this use case, a genuine user is attempting to access the protected resource 111. The risk engine 134 calculates a high initial risk score, but after incorporating the unique identifiers from the test results a modified risk score indicating a low level of risk is obtained. As the risk engine 134 has a low confidence in its high initial risk score, it indicates a false positive. In accordance with policy or user configuration, such false positive scenarios may result in the authentication server 112 granting the user device 102-1 access to the protected resource 111 as shown.

Figure 6:
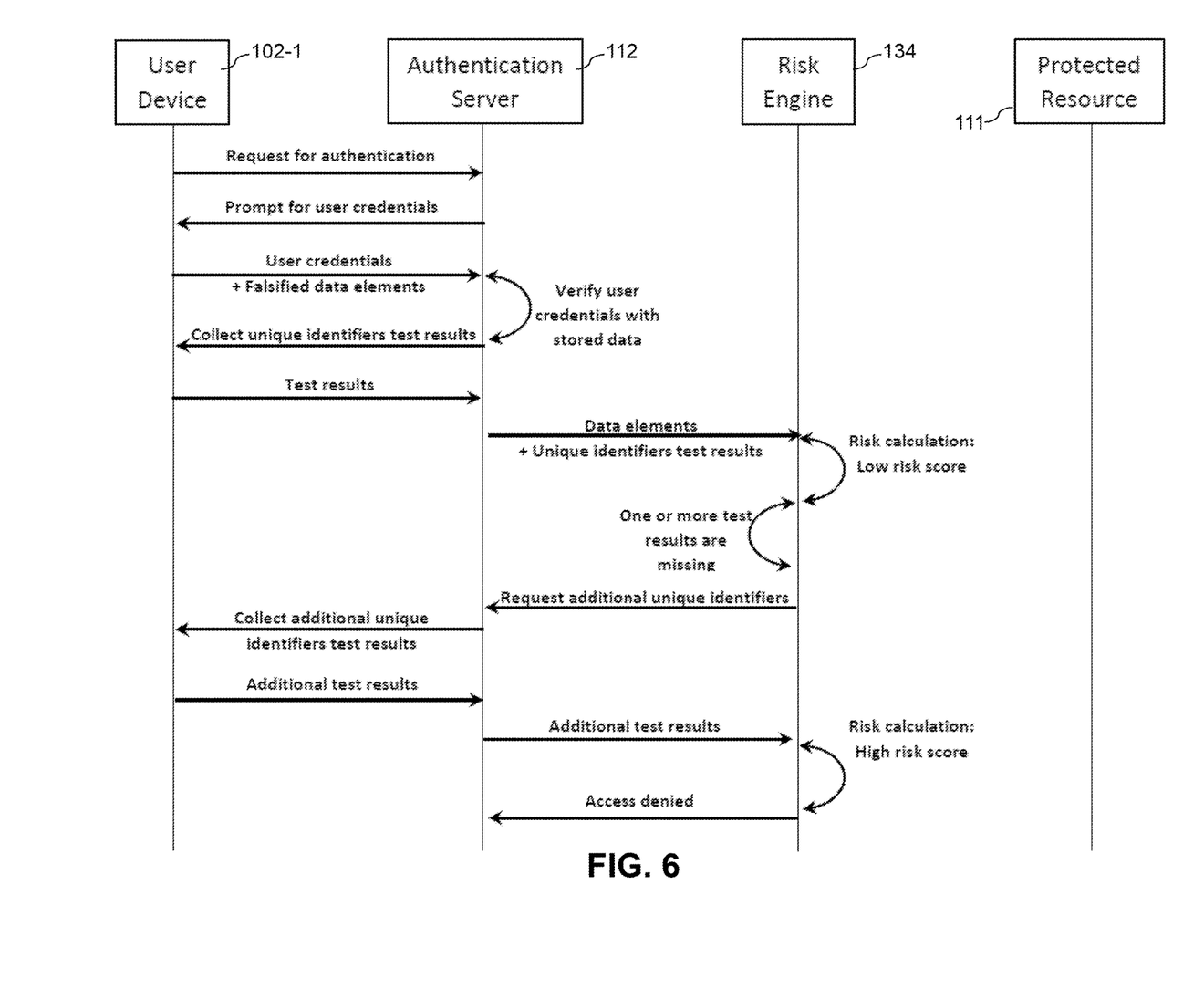

FIG. 6 illustrates a fourth and final use case. This use case involves a fraudulent user with a low initial risk score and one or more missing device identifiers. In this use case, a fraudulent user is illustratively attempting to bypass detection by blocking the execution of one or more of the automated tests for unique identifiers, while allowing the execution of other ones of the automated tests for which the resulting user device identifier will match that of a genuine user device. The risk engine 134 recognizes that one or more test results are missing, and sends a request to the authentication server 112 for additional unique identifiers. The authentication server 112 in turn performs one or more additional automated tests to collect additional test results that are provided back to the risk engine 134. This leads to generation of a modified risk score indicating a high level of risk, and the user device 102-1 is therefore denied access to the protected resource 111.

The particular automated device identifier determination and risk-based access control arrangements described in the use cases of FIGS. 3 through 6 above are exemplary only, and numerous alternative processing arrangements can be used in other embodiments. Accordingly, the various characteristics of these embodiments are intended to be illustrative only and should not be construed as limiting in any way.

The above-described illustrative embodiments provide significant advantages relative to conventional approaches.

For example, some embodiments are configured to provide non-intrusive determination of "strong" device identifiers that enhance risk-based access control. The device identifiers are strong in that in many cases the device identifiers are difficult for a fraudulent user to fabricate and the automated tests that detect such device identifiers are difficult for a fraudulent user to bypass or otherwise thwart. Moreover, the automated tests utilized to determine the device identifiers in some embodiments can accurately determine such device identifiers even in cases in which fraudulent users are utilizing tools such as FraudFox in an attempt to masquerade the characteristics of their user devices.

Illustrative embodiments can be readily integrated into existing products for risk-based access control such as RSA Adaptive Authentication products that utilize the above-described RSA CRE to generate risk scores. These embodiments through the use of automated tests to obtain unique identifiers or other types of device identifiers make it extremely difficult for fraudulent users to falsify data elements submitted in conjunction with authentication, thereby increasing the accuracy of the risk score and the security of the authentication process.

Such arrangements supplement conventional credential-based authentication techniques and advantageously provide enhanced security against APTs and other types of attacks in enterprise computer networks.

The automated determination of device identifiers for risk-based access control in illustrative embodiments generates highly accurate composite risk scores that result in lower rates of false positives and reduced numbers of misdetections.

These and other embodiments can effectively detect common attack vectors such as those that involve use of legitimate user credentials that are stolen by an attacker through phishing, breaking into credential databases, or infecting user devices with malware. The automated anomaly detection in illustrative embodiments is data driven and can detect an attack at an early stage of penetration before an attacker can cause further damage from within an internal network of an enterprise.

Automated determination of device identifiers for risk-based access control in some embodiments is implemented as an additional protective measure to supplement conventional credential-based authentication. Drawbacks of conventional credential-based authentication can therefore be avoided in illustrative embodiments. Accordingly, security is improved and the probability of detecting a given attack at an early stage is increased. Furthermore, the risk analysis in some embodiments is applied in a backend network security system and the process is transparent with no adverse impact on usability for legitimate users.

It is to be appreciated that the foregoing advantages are illustrative of advantages provided in certain embodiments, and need not be present in other embodiments.

The computer networks disclosed herein are illustratively implemented using one or more processing platforms, examples of which will be now be described in greater detail. A given such processing platform comprises at least one processing device comprising a processor coupled to a memory.

Illustrative embodiments of processing platforms utilized to implement at least portions of the above-described automated device identifier determination functionality for risk-based access control will now be described in greater detail. Although described in the context of computer network 100, these platforms may also be used to implement at least portions of other computer networks in other embodiments.

In one embodiment, an example processing platform comprises cloud infrastructure. The cloud infrastructure comprises a combination of physical and virtual processing resources that may be utilized to implement at least a portion of the computer network 100. The cloud infrastructure comprises multiple virtual machines (VMs) and/or container sets implemented using virtualization infrastructure. The virtualization infrastructure runs on physical infrastructure, and illustratively comprises one or more hypervisors and/or operating system level virtualization infrastructure. The operating system level virtualization infrastructure illustratively comprises kernel control groups of a Linux operating system or other type of operating system.

The cloud infrastructure further comprises sets of applications running on respective ones of the VMs/container sets under the control of the virtualization infrastructure. The VMs/container sets may comprise respective VMs, respective sets of one or more containers, or respective sets of one or more containers running in VMs.

In some implementations of this embodiment, the VMs/container sets comprise respective VMs implemented using virtualization infrastructure that comprises at least one hypervisor. Such implementations can provide automated device identifier determination functionality for risk-based access control of the type described above at least in part utilizing processes running on the VMs. For example, different ones of the VMs can implement different portions of the network security system 105 of the computer network 100.

An example of a hypervisor platform that may be used to implement a hypervisor within the virtualization infrastructure is the VMware® vSphere® which may have an associated virtual infrastructure management system such as the VMware® vCenter™. The underlying physical machines may comprise one or more distributed processing platforms that include one or more storage systems.

In other implementations of this embodiment, the VMs/container sets comprise respective containers implemented using virtualization infrastructure that provides operating system level virtualization functionality, such as support for Docker containers running on bare metal hosts, or Docker containers running on VMs. The containers are illustratively implemented using respective kernel control groups of the operating system. Such implementations can provide automated device identifier determination functionality for risk-based access control of the type described above at least in part utilizing processes running on the containers. For example, a container host device supporting multiple containers of one or more container sets can implement different portions of the network security system 105 of the computer network 100.

As is apparent from the above, one or more of the processing modules or other components of computer network 100 may each run on a computer, server, storage device or other processing platform element. A given such element may be viewed as an example of what is more generally referred to herein as a "processing device." The cloud infrastructure described above may represent at least a portion of one processing platform. Another example of such a processing platform comprises a plurality of processing devices which communicate with one another over a network.

The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device in the processing platform comprises a processor coupled to a memory.

The processor may comprise a microprocessor, a microcontroller, an ASIC, an FPGA, a GPU or other type of processing circuitry, as well as portions or combinations of such circuitry elements.

The memory may comprise RAM, ROM, flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device is network interface circuitry, which is used to interface the processing device with the network and other system components, and may comprise conventional transceivers.

Other processing devices of the processing platform are assumed to be configured in a manner similar to that described above.

Again, the particular processing platforms described above are presented by way of example only, and computer network 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of a computer network as disclosed herein can be implemented at least in part in the form of one or more software programs stored in memory and executed by a processor of a processing device. For example, components of a network security system configured with functionality for automated determination of device identifiers as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of computer networks comprising different arrangements of devices and systems. Also, the particular operations utilized in illustrative embodiments to provide automated device identifier determination and associated risk-based access control can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
    receiving user credentials from a user device in conjunction with an access request;
    determining one or more device identifiers of the user device;
    generating a risk score for the access request based at least in part on the received user credentials and the one or more determined device identifiers; and
    granting or denying the access request based at least in part on the risk score;
    wherein generating the risk score based at least in part on the received user credentials and the one or more determined device identifiers comprises:
    generating the risk score as an initial risk score for the access request utilizing the received user credentials and without utilizing the one or more determined device identifiers; and
    responsive to the initial risk score being above a specified threshold, utilizing the one or more determined device identifiers to generate a modified risk score;
    wherein granting or denying the access request is based at least in part on the modified risk score; and
    wherein the method is performed by at least one processing device comprising a processor coupled to a memory.

2. The method of claim 1 wherein the user credentials comprise one or more initial device identifiers supplied by the user device and wherein the one or more determined device identifiers are respective additional device identifiers relative to the one or more initial device identifiers.

3. The method of claim 2 wherein generating the risk score based at least in part on the received user credentials and the one or more determined device identifiers comprises:
    cross-referencing the one or more initial device identifiers with the respective additional device identifiers to determine whether or not the user device has submitted at least one potentially fraudulent initial device identifier; and
    utilizing a result of the cross-referencing in generating the risk score.

4. The method of claim 1 wherein granting or denying the access request based at least in part on the modified risk score comprises:
    responsive to the modified risk score being greater than the initial risk score, the access request is denied; and
    responsive to the modified risk being lower than the initial risk score, the access request is granted.

5. The method of claim 1 wherein determining the one or more device identifiers of the user device comprises determining at least one of an operating system identifier of the user device and a particular type of JavaScript engine utilized in a browser of the user device.

6. The method of claim 5 wherein determining the operating system identifier of the user device is based at least in part on an environment variable of the user device having a particular predetermined format.

7. The method of claim 5 wherein determining the operating system identifier of the user device is based at least in part on the user device utilizing a particular type of file system.

8. The method of claim 5 wherein determining the operating system identifier of the user device is based at least in part on a file structure of the user device having a particular predetermined format.

9. The method of claim 5 wherein determining the operating system identifier of the user device is based at least in part on the user device including one or more predetermined binaries.

10. The method of claim 5 wherein determining the operating system identifier of the user device is based at least in part on the user device including one or more predetermined network device characteristics, with the predetermined network device characteristics comprising at least one of:
    utilization of a particular Internet protocol identification field generation algorithm;
    utilization of a particular one of a big-endian ordering or a little-endian ordering in ordering data for network transmission;
    utilization of a particular sequence number generation algorithm as part of a handshake protocol.

11. The method of claim 1 wherein determining the one or more device identifiers of the user device comprises determining whether or not the user device is a mobile device.

12. The method of claim 1 wherein determining the one or more device identifiers of the user device comprises determining whether or not the user device supports at least one particular application programming interface for at least one of a particular type of sensor, a particular type of communication hardware and a particular type of input device.

13. An apparatus comprising:
    at least one processing device comprising a processor coupled to a memory;
    said at least one processing device being configured:
    to receive user credentials from a user device in conjunction with an access request;
    to determine one or more device identifiers of the user device;
    to generate a risk score for the access request based at least in part on the received user credentials and the one or more determined device identifiers; and to grant or deny the access request based at least in part on the risk score;

wherein generating the risk score based at least in part on the received user credentials and the one or more determined device identifiers comprises:

generating the risk score as an initial risk score for the access request utilizing the one or more determined device identifiers;

determining that one or more additional device identifiers of the user device are missing from a desired set of device identifiers;

determining the one or more additional device identifiers; and generating a modified risk score utilizing the one or more additional device identifiers;

wherein granting or denying the access request is based at least in part on the modified risk score.

14. A computer program product comprising a non-transitory processor-readable storage medium having stored therein program code of one or more software programs, wherein the program code when executed by at least one processing device causes said at least one processing device:

to receive user credentials from a user device in conjunction with an access request;

to determine one or more device identifiers of the user device;

to generate a risk score for the access request based at least in part on the received user credentials and the one or more determined device identifiers; and to grant or deny the access request based at least in part on the risk score;

wherein generating the risk score based at least in part on the received user credentials and the one or more determined device identifiers comprises:

generating the risk score as an initial risk score for the access request utilizing the received user credentials and without utilizing the one or more determined device identifiers; and responsive to the initial risk score being above a specified threshold, utilizing the one or more determined device identifiers to generate a modified risk score;

wherein granting or denying the access request is based at least in part on the modified risk score.

15. The computer program product of claim 14 wherein determining the one or more device identifiers of the user device comprises determining at least one of:

an operating system identifier of the user device;

a particular type of JavaScript engine utilized in a browser of the user device;

whether or not the user device is a mobile device; and whether or not the user device supports at least one particular application programming interface for at least one of a particular type of sensor, a particular type of communication hardware and a particular type of input device.

16. An apparatus comprising:

at least one processing device comprising a processor coupled to a memory;

said at least one processing device being configured:

to receive user credentials from a user device in conjunction with an access request;

to determine one or more device identifiers of the user device;

to generate a risk score for the access request based at least in part on the received user credentials and the one or more determined device identifiers; and to grant or deny the access request based at least in part on the risk score;

wherein generating the risk score based at least in part on the received user credentials and the one or more determined device identifiers comprises:

generating the risk score as an initial risk score for the access request utilizing the received user credentials and without utilizing the one or more determined device identifiers; and responsive to the initial risk score being above a specified threshold, utilizing the one or more determined device identifiers to generate a modified risk score;

wherein granting or denying the access request is based at least in part on the modified risk score.

17. The apparatus of claim 16 wherein determining the one or more device identifiers of the user device comprises determining at least one of:

an operating system identifier of the user device;

a particular type of JavaScript engine utilized in a browser of the user device;

whether or not the user device is a mobile device; and whether or not the user device supports at least one particular application programming interface for at least one of a particular type of sensor, a particular type of communication hardware and a particular type of input device.

18. The apparatus of claim 17 wherein determining the operating system identifier of the user device is based at least in part on an environment variable of the user device having a particular predetermined format.

19. The apparatus of claim 17 wherein determining the operating system identifier of the user device is based at least in part on the user device utilizing a particular type of file system.

20. The apparatus of claim 17 wherein determining the operating system identifier of the user device is based at least in part on a file structure of the user device having a particular predetermined format.

* * * * *